(12) United States Patent
Okayama et al.

(10) Patent No.: US 10,759,373 B2
(45) Date of Patent: Sep. 1, 2020

(54) AIRBAG DEVICE

(71) Applicant: TOYODA GOSEI CO., LTD., Kiyosu-shi, Aichi-ken (JP)

(72) Inventors: Yuhta Okayama, Kiyosu (JP); Nobuya Nakano, Osaka (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 99 days.

(21) Appl. No.: 16/165,236

(22) Filed: Oct. 19, 2018

(65) Prior Publication Data
US 2019/0118757 A1   Apr. 25, 2019

(30) Foreign Application Priority Data

Oct. 23, 2017  (JP) .................................. 2017-204621

(51) Int. Cl.
*B60R 21/217* (2011.01)
*B60R 21/0136* (2006.01)
*B60R 21/231* (2011.01)
*B60R 21/264* (2006.01)

(52) U.S. Cl.
CPC ...... *B60R 21/2171* (2013.01); *B60R 21/0136* (2013.01); *B60R 21/23138* (2013.01); *B60R 21/264* (2013.01); *B60R 2021/23146* (2013.01)

(58) Field of Classification Search
CPC ................................................ B60R 21/2171
See application file for complete search history.

(56) References Cited

U.S. PATENT DOCUMENTS

| | | | |
|---|---|---|---|
| 8,047,570 B2 * | 11/2011 | Feller | B60R 21/239 280/743.1 |
| 9,290,148 B2 * | 3/2016 | Hotta | B60R 21/2171 |
| 9,731,634 B2 * | 8/2017 | Kanto | B60N 2/42763 |
| 10,035,488 B2 * | 7/2018 | Nagata | B60R 21/2171 |

(Continued)

FOREIGN PATENT DOCUMENTS

| | | | |
|---|---|---|---|
| JP | 2005-104176 A | | 4/2005 |
| JP | 2014196063 A | * | 10/2014 |

OTHER PUBLICATIONS

Satomichi Komatsu, Air Bag Device, Oct. 16, 2014, EPO, JP 2014-196063 A, English Abstract (Year: 2014).*

(Continued)

*Primary Examiner* — James A English
(74) *Attorney, Agent, or Firm* — Posz Law Group, PLC

(57) ABSTRACT

An airbag device includes: a gas generator including: an inflator having one end portion to which a connected part is provided; and a cylindrical retainer configured to cover the inflator; and an airbag including a bag main body having an insertion opening. A part of an outer end part of the retainer inserted in the insertion opening is arranged outside the bag main body together with the connected part, and a remaining part of the retainer is arranged inside the bag main body. The outer end part of the retainer is formed with an extension part extending in a direction of being separated away from the gas blowout part. The bag main body has a clearance filling part configured to fill a part of a clearance between the inflator and the retainer, and the clearance filling part is sandwiched by the inflator and the extension part.

6 Claims, 11 Drawing Sheets

(56) References Cited

U.S. PATENT DOCUMENTS

| | | | |
|---|---|---|---|
| 2008/0088118 A1* | 4/2008 | Wipasuramonton | ........................ B60R 21/2171 280/728.2 |
| 2008/0116669 A1* | 5/2008 | Adachi | ................ B60R 21/203 280/730.1 |
| 2017/0057386 A1* | 3/2017 | Kanto | ................ B60N 2/42763 |
| 2018/0281733 A1* | 10/2018 | Shigemura | .......... B60R 21/2171 |
| 2018/0281734 A1* | 10/2018 | Shigemura | .......... B60R 21/2171 |
| 2018/0281735 A1* | 10/2018 | Shigemura | ............ B60R 21/217 |

OTHER PUBLICATIONS

Satomichi Komatsu, Air Bag Device, Oct. 16, 2014, EPO, JP 2014-196063 A, Machine Translation of Description (Year: 2014).*

* cited by examiner

AIRBAG DEVICE

CROSS-REFERENCE TO RELATED APPLICATION(S)

This application is based upon and claims the benefit of priority from prior Japanese patent application No. 2017-204621, filed on Oct. 23, 2017, the entire contents of which are incorporated herein by reference.

BACKGROUND

The present invention relates to an airbag device that, when a shock is applied to a vehicle due to a collision or the like, protects a passenger from the shock by deploying and inflating an airbag at a place close to the passenger sitting on a vehicular seat.

An airbag device including a gas generator and an airbag is efficient as a device that, when a shock is applied to a vehicle due to a collision or the like, protects a passenger from the shock.

For example, in an airbag device disclosed in Patent Document 1, a gas generator is used which extends along an axis line and includes: an inflator having one end portion, to which a connected part to which a harness is to be connected is provided; and a cylindrical retainer configured to cover the inflator. Also, an airbag is used which includes: a bag main body having an insertion opening and configured to deployed and inflated by an inflation gas to be supplied from the inflator of the gas generator inserted through the insertion opening; and a tongue piece formed at the bag main body and configured to cover the insertion opening.

In the airbag device, when mounting the gas generator and the harness to the airbag, the retainer is inserted in the insertion opening. A bolt protruding from the retainer is inserted in the bag main body, so that the retainer is engaged to the bag main body. Then, the inflator is inserted in the retainer from an outside of the bag main body. In this state, the connected part is exposed to the outside of the bag main body. Then, the insertion opening is covered by the tongue piece. At this time, the connected part is inserted in a hole formed in the tongue piece. Also, the tongue piece is inserted in the bag main body and is engaged to the bolt exposed from the bag main body. The harness is connected to the connected part through the hole of the tongue piece from the outside of the airbag.

In the meantime, before the insertion opening is covered by the tongue piece, the harness may be connected to the connected part through the hole of the tongue piece.

Then, the bolt is inserted in a vehicle body (a seat frame and the like), and a nut is fastened to the bolt, so that the gas generator is mounted to the vehicle body together with the airbag.

According to the above airbag device, it is possible to suppress the inflation gas supplied from the inflator from being leaked to the outside of the airbag through the insertion opening by the tongue piece.

Patent Document 1: JP-A-2005-104176

In Patent Document 1, since the insertion opening is covered by the tongue piece, it is possible to suppress the leakage of the inflation gas but it is necessary to perform an operation of inserting the connected part and the harness into the hole of the tongue piece, which lowers mounting operability.

The present invention has been made in view of the above situations, and an object thereof is to provide an airbag device capable of improving mounting operability while suppressing leakage of an inflation gas to an outside of an airbag.

SUMMARY

In order to achieve the object, according to an aspect of the invention, there is provided an airbag device comprising: a gas generator which extends along an axis line, and which includes: an inflator having one end portion to which a connected part to which a harness is to be connected is provided; and a cylindrical retainer configured to cover the inflator; and an airbag which includes a bag main body having an insertion opening, wherein a part of an outer end part, which is an end part located at the same side as the connected part of the inflator, of the retainer of the gas generator, which is inserted in the insertion opening, is arranged outside the bag main body together with the connected part of the inflator, and a remaining part of the retainer is arranged inside the bag main body together with a gas blowout part of the inflator, and the airbag configured to be deployed and inflated by an inflation gas to be supplied from the gas blowout part to the bag main body, wherein the gas generator and the airbag are mounted to a vehicle at a mounting part provided to the retainer, the outer end part of the retainer is formed with an extension part extending in a direction of being separated away from the gas blowout part along the axis line, and the bag main body has a clearance filling part that is configured to fill a part of a clearance between the inflator and the retainer and that is provided at a part around the insertion opening, and the clearance filling part is sandwiched by the inflator and the extension part of the retainer.

DETAILED DESCRIPTION OF EXEMPLARY EMBODIMENTS

Hereinafter, an illustrative embodiment implemented as a vehicular side airbag device will be described with reference to FIGS. 1 to 12.

Meanwhile, in below descriptions, a forward movement direction of a vehicle is described as 'front', and a backward movement direction of the vehicle is described as 'rear'. Also, a central part in a width direction of the vehicle (vehicle width direction) is set as a standard, a side close to the central part is referred to as 'vehicle interior side' and a side distant from the central part is referred to as 'vehicle exterior side'. Also, it is assumed that a passenger whose physique is similar to a dummy for collision test sits on a vehicular seat with predetermined normal posture.

Figure 1:
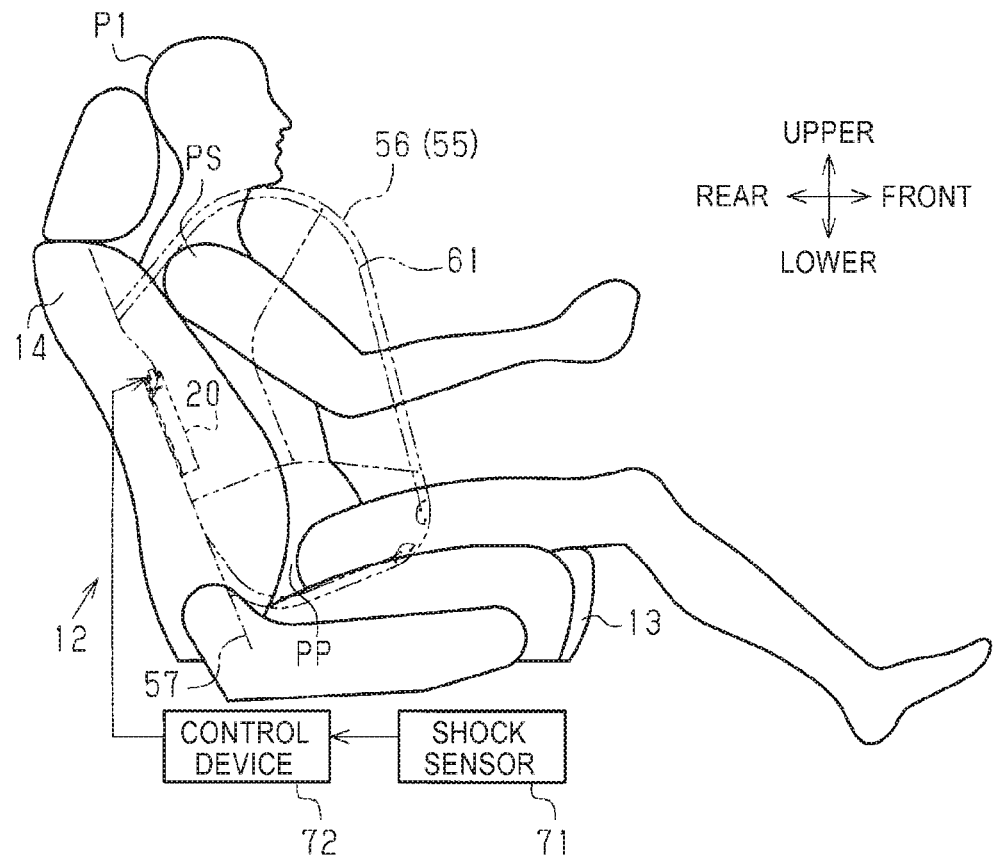
FIG. 1 depicts an illustrative embodiment implemented as a vehicular side airbag device, and is a side view depicting a vehicular seat having the device provided thereto, together with a passenger.
Figure 2:
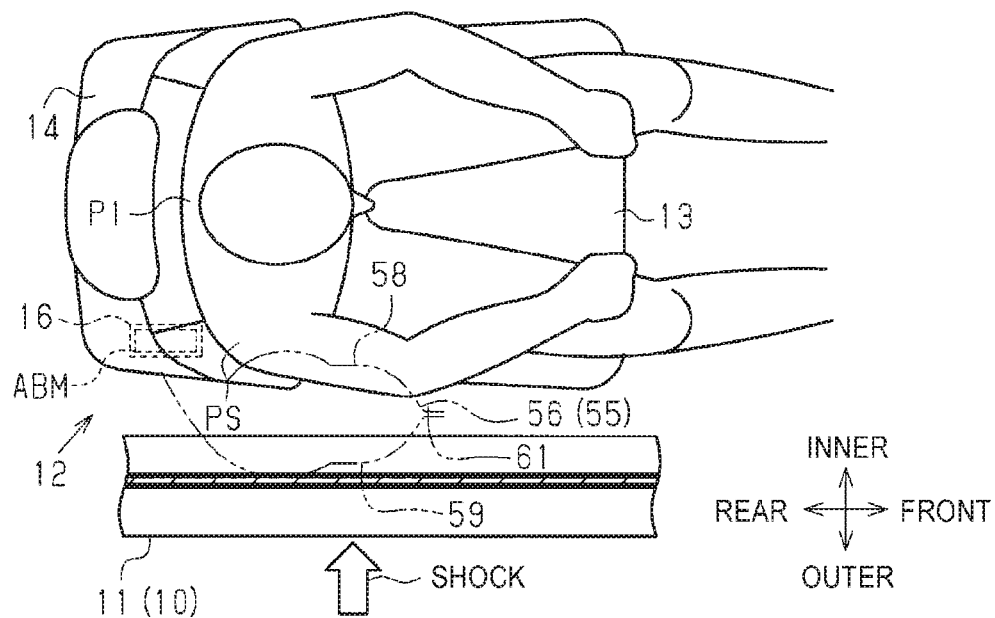
FIG. 2 is a partial top cross-sectional view depicting a positional relation among the vehicular seat, an airbag, the passenger and a sidewall part, in the illustrative embodiment.
Figure 3:
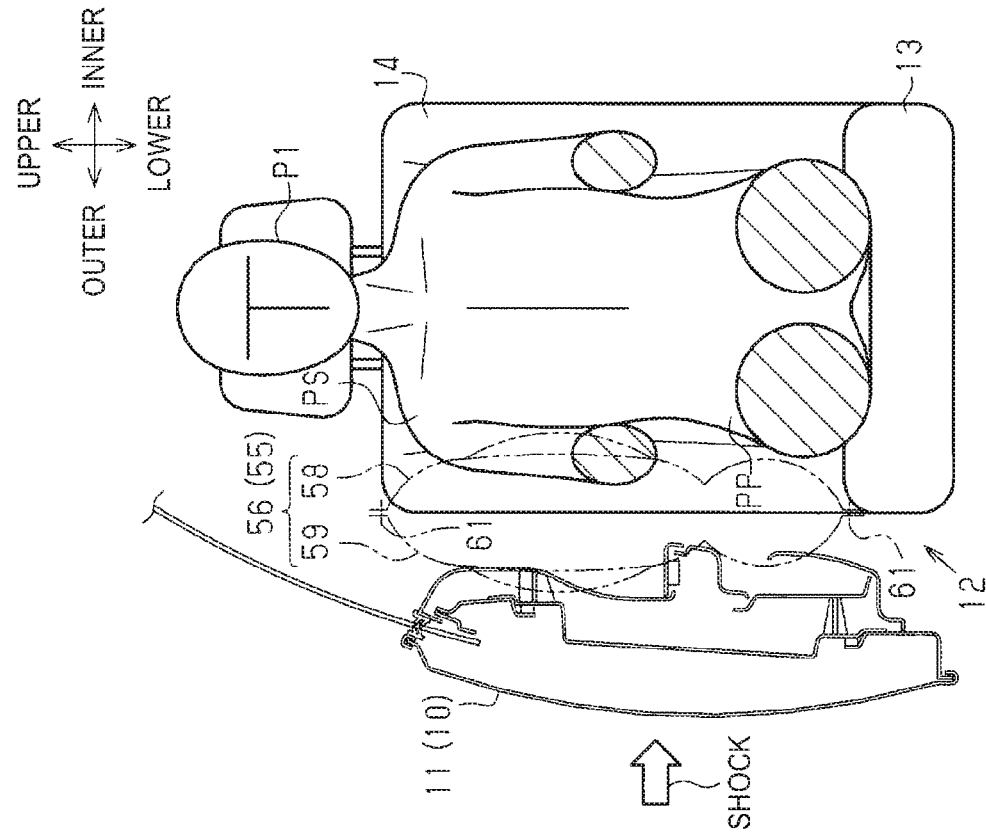
FIG. 3 is a partial sectional view depicting the positional relation among the vehicular seat, the airbag, the passenger and the sidewall part, in the illustrative embodiment.

As shown in FIGS. 1 to 3, a vehicular seat 12, which is a vehicular seat configuring a front seat, is arranged in the vicinity of the vehicle interior side of a sidewall part 11 of a vehicle 10. Here, the sidewall part 11 indicates a constitutional member of the vehicle arranged at a side of the vehicle 10, and mainly corresponds to a door, a pillar or the like. The sidewall part 11 corresponding to the front seat is a front door, a center pillar (B pillar) or the like.

The vehicular seat 12 includes a seat cushion 13 and a seat back 14. The seat cushion 13 is mounted to a vehicle body floor so that a position in a front and back direction can be adjusted. The seat back 14 is erected in a state where it is inclined from a rear part of the seat cushion 13 so that the upper side thereof is located more rearward, and is configured so that an inclination angle thereof can be adjusted. The vehicular seat 12 is arranged in a vehicle interior with a posture that the seat back 14 faces forward. A width direction of the vehicular seat 12 arranged in this way coincides with the vehicle width direction.

In the seat back 14, a seat frame configuring a skeleton thereof is arranged. A part of the seat frame is configured by a side frame part 15 arranged at a vehicle exterior side part in the seat back 14, as shown in FIG. 8.

An accommodation part 16 is provided at a place which is in the seat back 14 and is adjacent to the vehicle exterior side with respect to the side frame part 15, and an airbag module ABM configuring a main part of the side airbag device is incorporated therein. The airbag module ABM includes a gas generator 20 and an airbag 55, as main constitutional members (refer to FIG. 1). In the below, each of the constitutional members is described.

<Gas Generator 20>

Figure 7:
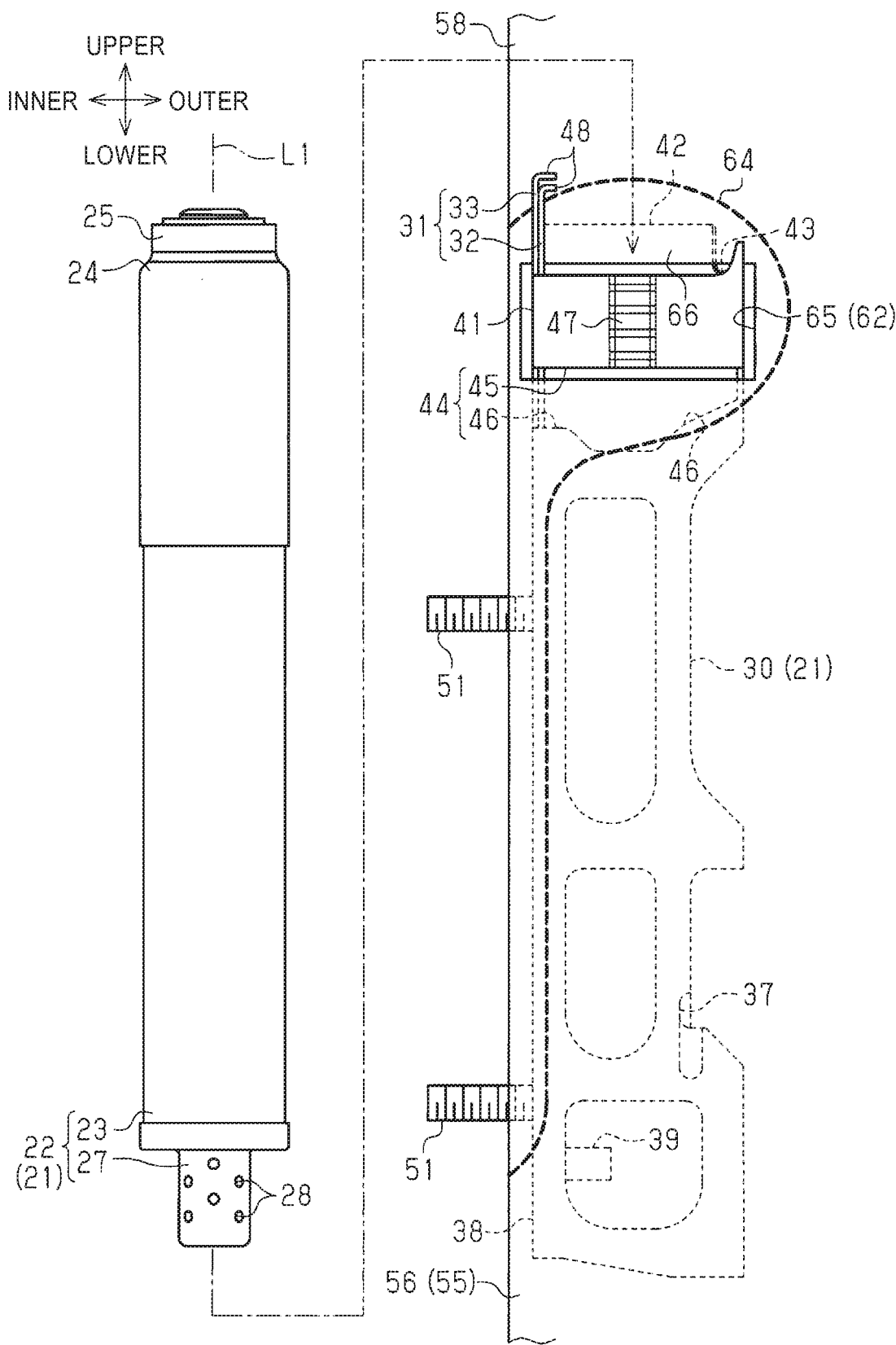
FIG. 7 is a partial rear view depicting the retainer inserted in an insertion opening of a bag main body and an inflator inserted in the retainer from an outside of the bag main body, in the illustrative embodiment.
Figure 8:
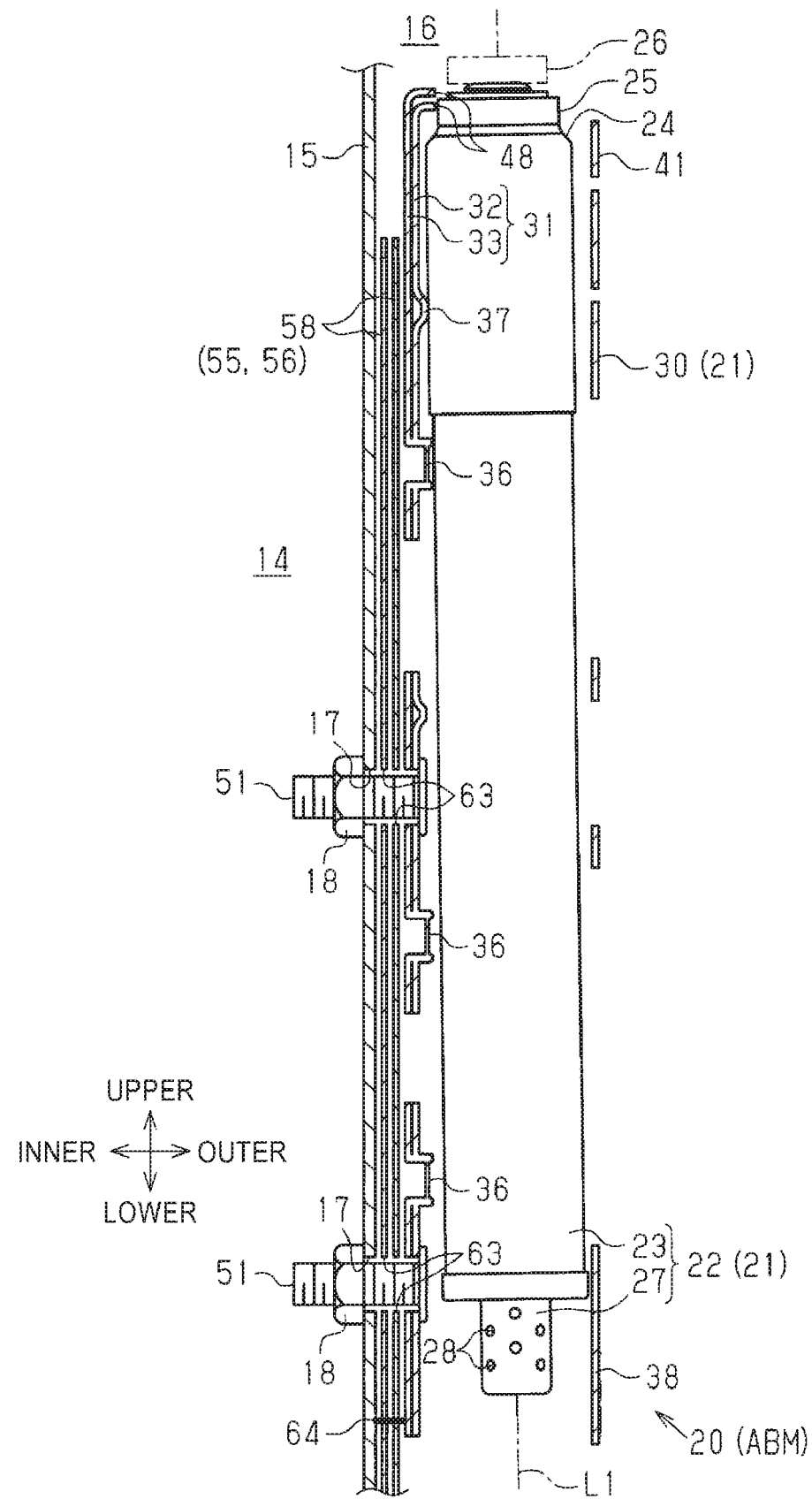
FIG. 8 is a partial sectional view depicting a state where the airbag module is mounted to a side frame part, in the illustrative embodiment.

As shown in FIGS. 7 and 8, the gas generator 20 is configured by a generator main body 21 and mounting protrusions 51 functioning as a mounting part for mounting the generator main body 21 to the side frame part 15 together with the airbag 55.

The generator main body 21 includes an inflator 22, and a retainer 30 configured to cover the inflator 22, and has an elongated shape extending substantially in the upper and lower direction along an axis line L1, as a whole.

In the illustrative embodiment, a pyro type inflator is adopted as the inflator 22. The inflator 22 has a gas generation part 23 and a gas blowout part 27 each of which has a cylinder shape extending substantially in the upper and lower direction along the axis line L1.

In the gas generation part 23, a gas generating agent (not shown) for generating an inflation gas is accommodated. The gas generation part 23 has a tapered part 24 having a diameter, which reduces upward, and provided at an upper end portion, and a connected part 25 provided at an upper side of the tapered part. The connected part 25 is connected with a harness 26 (refer to FIG. 11), which is an input wiring of an operation signal to the inflator 22.

The gas blowout part 27 has a diameter smaller than the gas generation part 23 and is provided coaxially with the gas generation part 23 in the vicinity of a lower side of the gas generation part 23. The gas blowout part 27 has a plurality of gas blowout holes 28 for blowing out the inflation gas at an outer periphery part.

In the meantime, as the inflator 22, instead of the pyro type inflator using the gas generating agent, a hybrid type inflator configured to blow out the inflation gas by breaking a partition wall of a high-pressure gas tank having a high-pressure gas filled therein with gunpowder or the like may be used.

In the meantime, the retainer 30 configures an outer periphery part of the generator main body 21. The retainer 30 is a member configured to function as a diffuser for controlling a blowout direction of the inflation gas and to mount the inflator 22 to the side frame part 15 together with the airbag 55. Most of the retainer 30 has a substantially cylindrical shape of which both ends are opened in a direction along the axis line L1 by bending a plate material such as a metal plate. In the illustrative embodiment, in order to distinguish both the end parts of the retainer 30, the end part (upper end part) positioned at the connected part 25-side is referred to as an outer end part 41, and the end part (lower end part) positioned at a side opposite to the connected part 25 is referred to as an inner end part 38.

Figure 10:
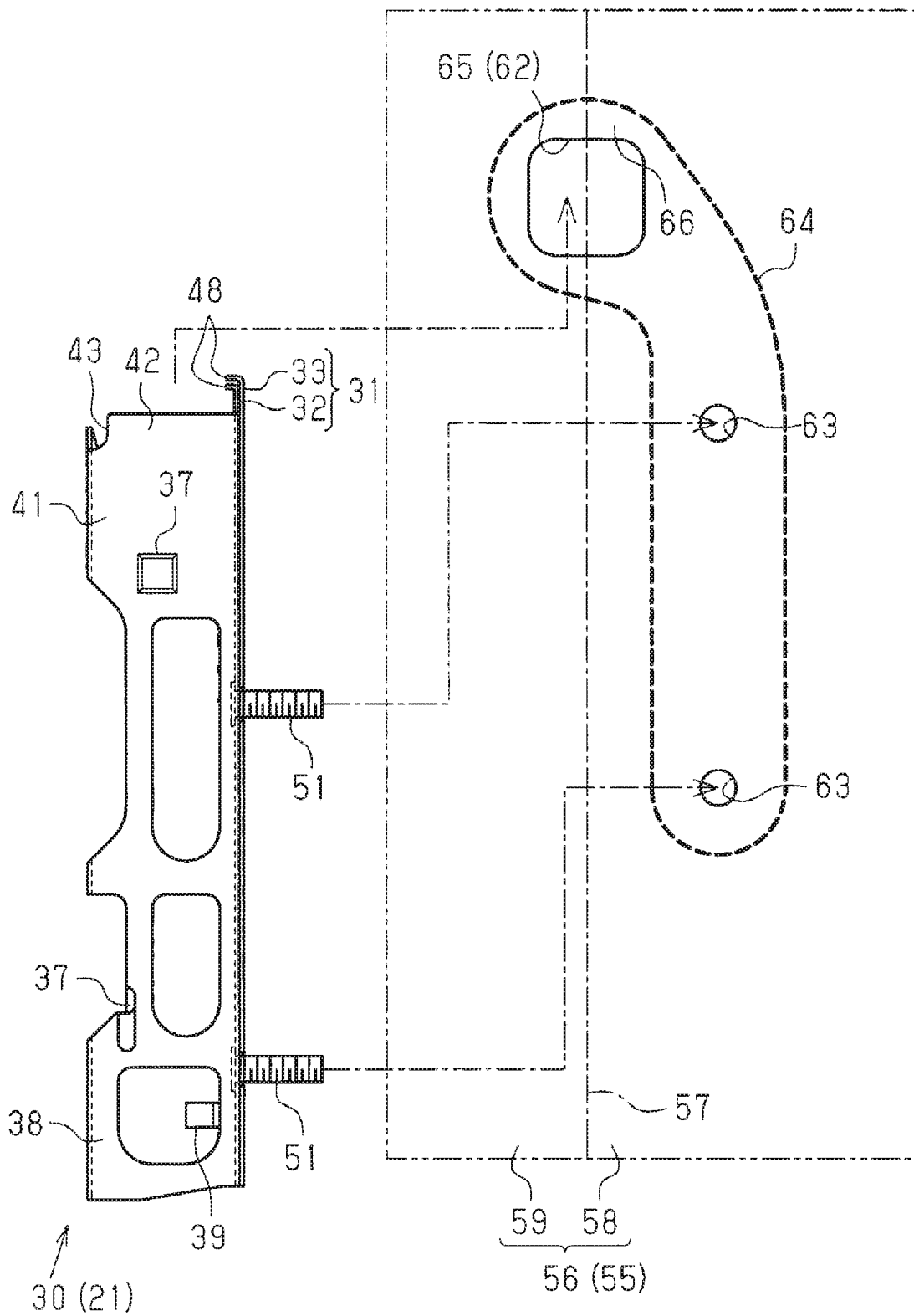
FIG. 10 is a partial side view depicting the bag main body and the retainer inserted in the insertion opening from an inside of the bag main body, in the illustrative embodiment.
Figure 11:
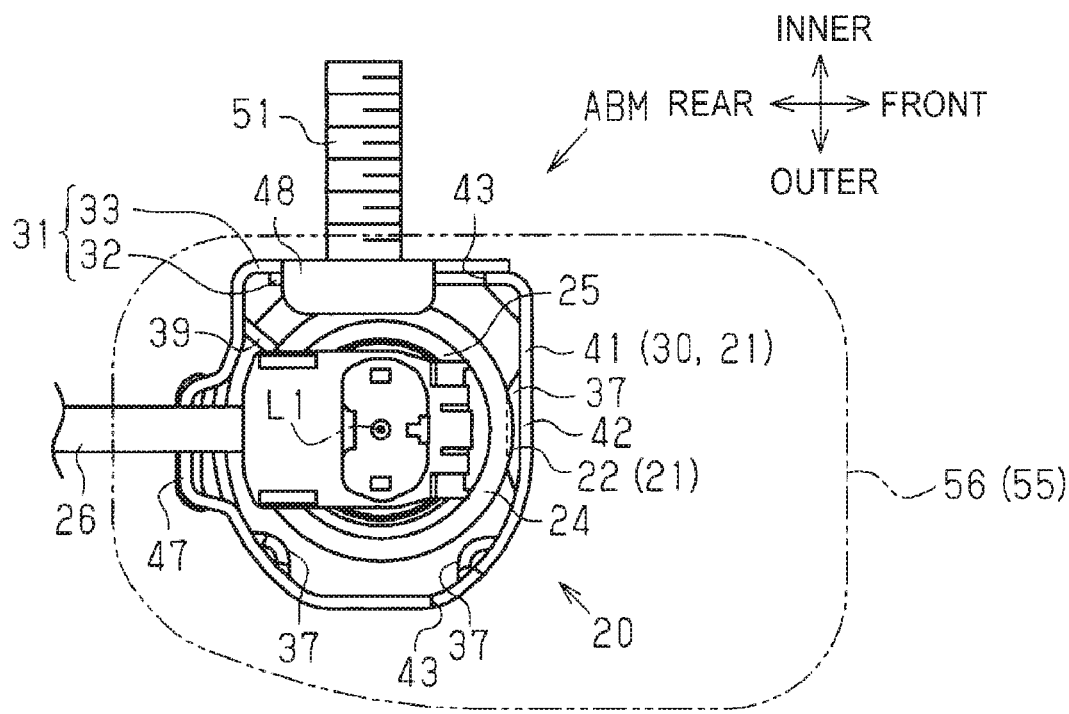
FIG. 11 is a plan view of the airbag module, in the illustrative embodiment.
Figure 12:
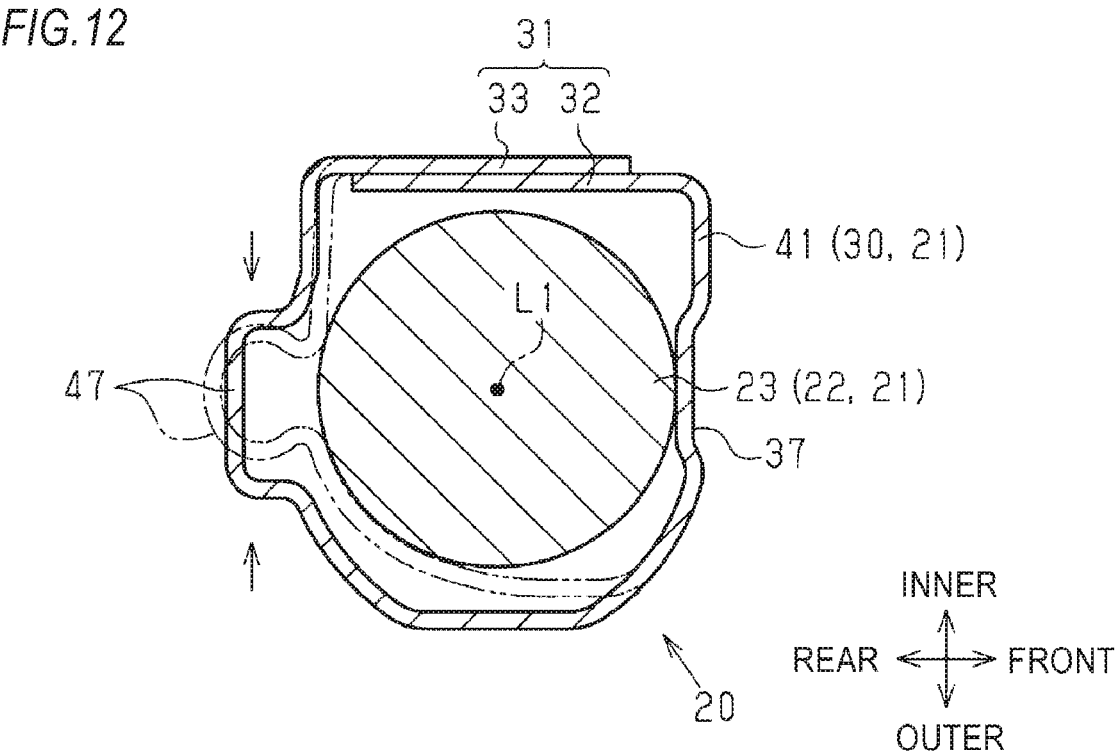
FIG. 12 is a top cross-sectional view illustrating an aspect where a swaged part is swaged and the retainer is thus engaged to the inflator, in the illustrative embodiment.

As shown in FIGS. 11 and 12, the retainer 30 has a flat base part 31 arranged in parallel with the axis line L1. The base part 31 is configured by superimposing both end portions 32, 33 of the bent plate material in parallel with each other. Both the end portions 32, 33 are bonded to each other by swaging. In FIG. 8, a reference numeral 36 indicates a swaged place (TOX). As shown in FIGS. 10 and 11, the retainer 30 is formed with beads 37 to inwardly protrude in a radial direction of the retainer 30 by deforming a part of the retainer.

Figure 9:
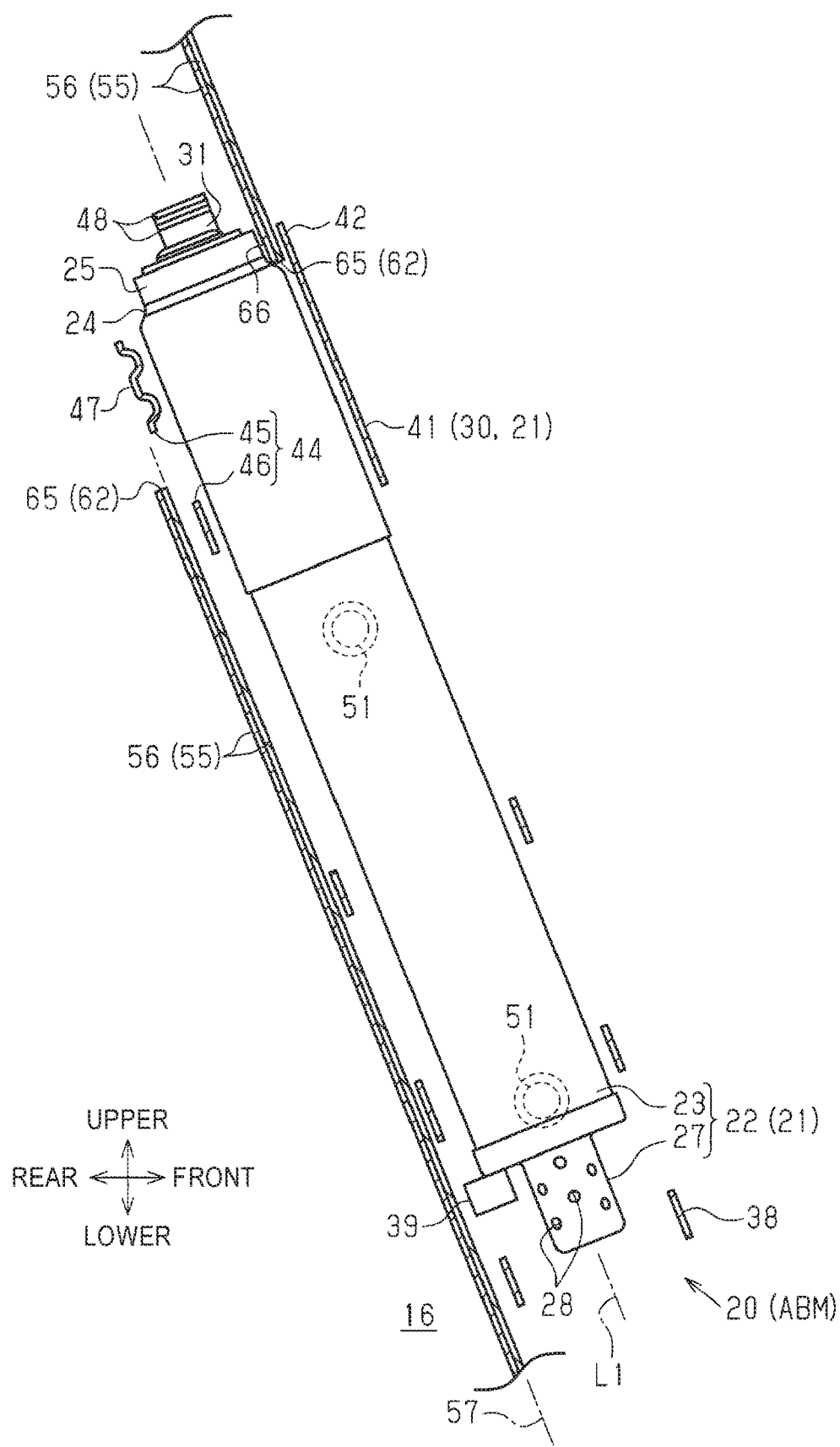
FIG. 9 is a partial sectional view depicting the state where the airbag module is mounted to the side frame part, in the illustrative embodiment.

As shown in FIGS. 7 and 11, the inner end part 38 of the retainer 30 is formed with a flat plate part 39 by bending a portion of the inner end part inwardly in the radial direction of the retainer 30. As shown in FIG. 9, the flat plate part 39 has a function of supporting the gas generation part 23 of the inflator 22 from a lower side thereof.

Figure 5:
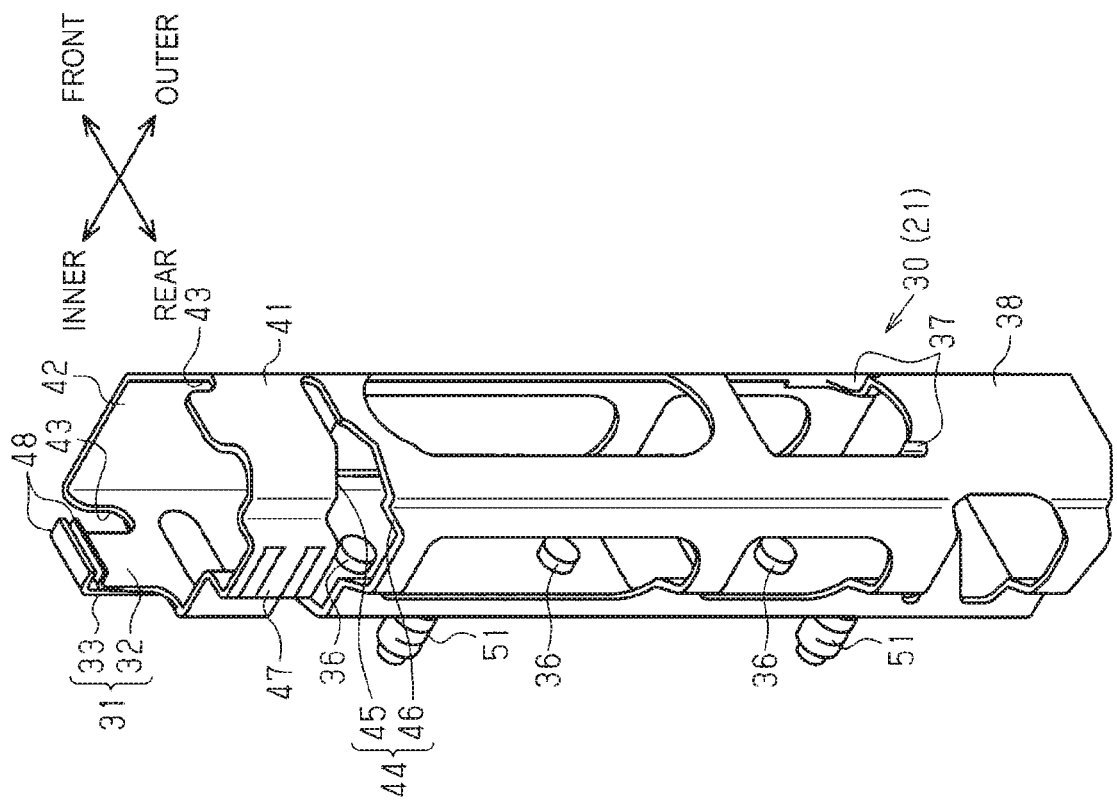
FIG. 5 is a perspective view of a retainer, in the illustrative embodiment.
Figure 6:
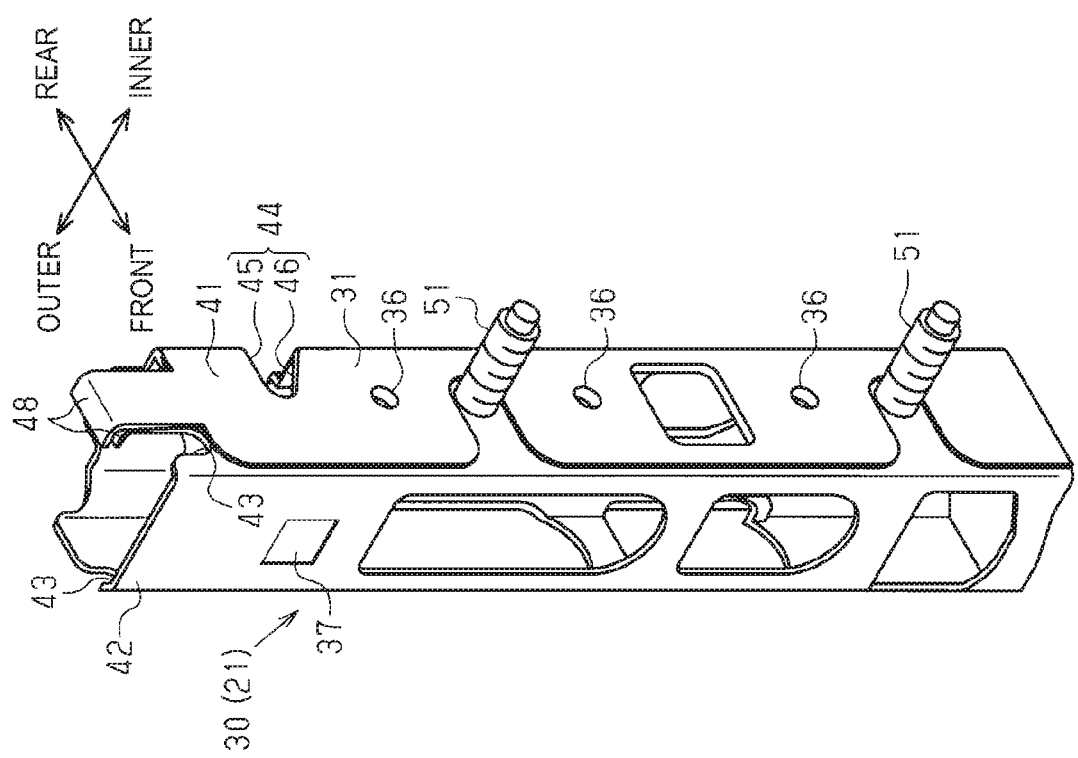
FIG. 6 is a perspective view of the retainer, as seen from a direction different from FIG. 5, in the illustrative embodiment.

As shown in FIGS. 5 to 7, an extension part 42 is formed at a place (front side part), which is the outer end part 41 of the retainer 30 and is adjacent to the base part 31 in a circumferential direction. The extension part 42 extends toward an upper side, which is a side being separated away from the gas blowout part 27, along the axis line L1.

Portions, which are located at both sides of the extension part 42 in the circumferential direction, of the outer end part 41 are formed with engaging concave portions 43 extending downward, which is opposite to the extending direction of the extension part 42. Both the engaging concave portions 43 have a function of engaging with a clearance filling part 66, which will be described later.

A notched part 44 is formed at a place, which is adjacent to a side (lower side) of the outer end part 41 facing toward the gas blowout part 27, of the retainer 30. The notched part 44 extends from a part (a rear part of the retainer 30), which is radially opposite to the extension part 42 with the axis line L1 being interposed therebetween, toward the extension part 42 along a peripheral wall part of the outer end part 41.

The notched part 44 has a pair of facing wall parts 45, 46 facing each other substantially in the upper and lower direction along the axis line L1. The lower facing wall part 46 is inclined relative to the axis line L1 so that a gap with the upper facing wall part 45 increases as being distant from the extension part 42.

A swaged part 47 is bending-formed to protrude rearward at a rear part of a place, which is adjacent to a side (upper side) of the notched part 44 being separated away from the gas blowout part 27, of the outer end part 41. The swaged part 47 is swaged, so that a diameter of the outer end part 41 is reduced and is press-fitted to an upper part of the gas generation part 23. By the press-fitting, the retainer 30 is engaged to the upper part of the gas generation part 23 at the outer end part 41.

A stopper 48 protruding inwardly in the radial direction of the retainer 30 is formed at a circumferential part, which is located at an opposite side (upper side) to the notched part 44 in the direction along the axis line L1 with the swaged part 47 being interposed therebetween, of the outer end part 41. In the illustrative embodiment, the base part 31 extends to a height higher than the extension part 42, and an upper end portion of the base part is formed with the stopper 48. The stopper 48 is formed at each of the end portions 32, 33 configuring the base part 31. Both the stoppers 48 have a function of contacting the tapered part 24 of the inflator 22 to restrain the inflator 22 from separating from the retainer 30.

As shown in FIGS. 8 and 9, the mounting protrusions 51 are fixed to two places of the retainer 30 spaced from each other in the direction along the axis line L1. Each of the mounting protrusions 51 is fixed to the base part 31 of which stiffness is increased due to the both the superimposed end portions 32, 33. The mounting protrusions 51 protrude in a direction perpendicular to the axis line L1 toward the same side, in the illustrative embodiment, toward the vehicle interior side. Each of the mounting protrusions 51 is configured by a bolt, in the illustrative embodiment. The pair of mounting protrusions 51 may have the same length or different lengths.

<Airbag 55>

Figure 4:
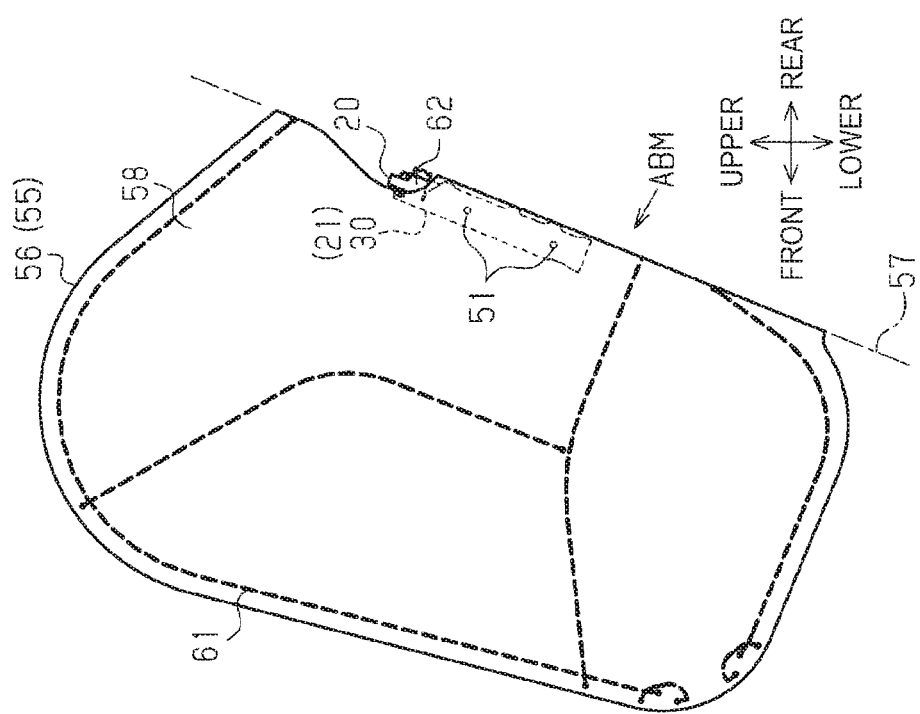
FIG. 4 is a side view of an airbag module in which the airbag is in a deployment and non-inflation state, in the illustrative embodiment.

FIG. 4 depicts an airbag module ABM in which the airbag 55 is deployed in a planar shape without filling the inflation gas (hereinafter, referred to as 'deployment and non-inflation state'), as seen from the vehicle interior side.

As shown in FIGS. 1 to 4, the airbag 55 has a bag main body 56 to which the inflation gas is to be supplied from the gas blowout part 27 of the inflator 22. The bag main body 56 is formed by two-folding and superimposing two superimposed fabric pieces (also referred to as base fabric, panel fabric and the like) in the vehicle width direction at a folding line 57 set at central portions in a width direction of the fabric pieces and joining the superimposed parts. Here, in order to distinguish the two superimposed parts of the bag main body 56, the part close to the passenger P1 is referred to as the main body fabric part 58 of the vehicle interior side, and the part distant from the passenger P1 is referred to as the main body fabric part 59 of the vehicle exterior side. A thickness direction and a vehicle width direction of the superimposed main body fabric parts 58, 59 coincide with each other.

Meanwhile, in the illustrative embodiment, the fabric pieces are two-folded so that the folding line 57 is located at a rear end portion of the bag main body 56. However, the fabric pieces may be two-folded so that the folding line 57 is located at another end portion of the bag main body 56, for example, a front end portion, an upper end portion, a lower end portion or the like. Also, the bag main body 56 may be configured by one fabric piece. Also, each of the fabric pieces may be split into a plurality of pieces.

The airbag 55 is configured to be deployed and inflated by the inflation gas that is to be supplied to the bag main body 56. The airbag 55 is formed to have a shape and a size capable of occupying most of the upper half of the passenger P1, for example, an area ranging from a waist part PP to a shoulder part PS when the airbag 55 is deployed and inflated between the vehicular seat 12 and the sidewall part 11.

As the bag main body 56, a material having high strength and flexibility for easy folding, for example, a woven cloth formed of polyester yarn, polyamide yarn or the like may be appropriately used.

Both the main body fabric parts 58, 59 are joined at a peripheral edge joining part 61 provided at peripheral edge portions thereof. In the illustrative embodiment, the peripheral edge joining part 61 is formed by sewing (stitching with a sewing thread) parts, except rear end portions (portions adjacent to the folding line 57), of the peripheral edge portions of both the main body fabric parts 58, 59. The joining by the sewing is also applied to a joining part 64 (refer to FIGS. 7, 10 and the like), which will be described later.

Meanwhile, in the illustrative embodiment, the sewn portion is shown by intermittently aligning thick lines of a constant length.

Also, the peripheral edge joining part 61 may be formed by a means different from the stitching using the sewing thread, for example, by adhesion using an adhesive. The joining part 64 is also the same.

Also, the bag main body 56 is provided with a partitioning part for partitioning an inside thereof into a plurality of rooms (inflation rooms), a member for rectifying the inflation gas, and the like, as parts of the constitutional members of the airbag 55.

As shown in FIGS. 7 and 10, an insertion opening 62 of the gas generator 20 (retainer 30) is opened at a part (a part close to an upper end portion) on the folding line 57 of the bag main body 56, which is an intermediate part in the upper and lower direction. The insertion opening 62 has such a size that the gas generator 20 passes at a place at which the mounting protrusion 51 is not provided and the gas generator 20 does not pass at a place at which the mounting protrusion 51 is provided. In the illustrative embodiment, the insertion opening 62 is formed to have a minimum size or almost minimum size through which the retainer 30 can pass. In other words, the insertion opening 62 is formed to have such a size that, in a state where the retainer 30 is inserted therein, a clearance between an opening edge portion 65 of the insertion opening 62 and the retainer 30 is negligible small with respect to leakage of the inflation gas. Also, as shown in FIGS. 8 and 10, a rear end portion of the main body fabric part 58 of the vehicle interior side is formed at two places lower than the insertion opening 62 with insertion holes 63 for inserting therein the mounting protrusions 51. The two fabric pieces configuring the bag main body 56 are joined to each other by an endless joining part 64 provided to surround the insertion opening 62 and both the insertion holes 63.

As shown in FIGS. 7 and 10, the retainer 30 is inserted in the insertion opening 62 from an inner side of the bag main body 56 toward an outer side. A part of the outer end part 41 of the retainer 30 is arranged outside the bag main body 56. A remaining part of the retainer 30 including the extension part 42 is arranged inside the bag main body 56.

Each mounting protrusion 51 is inserted in the corresponding insertion hole 63 of the main body fabric part 58 of the vehicle interior side. By the insertion, the retainer 30 is engaged to the main body fabric part 58 of the vehicle interior side with being positionally aligned.

As shown in FIGS. 7 and 9, a part of the bag main body 56 in a direction along the opening edge portion 65 of the insertion opening 62 around the insertion opening 62, in the illustrative embodiment, an upper part is sandwiched by the upper end portion of the gas generation part 23 and the extension part 42, as a clearance filling part 66 for filling a part of the clearance between the inflator 22 and the retainer 30. Also, the clearance filling part 66 is engaged to the pair of engaging concave portions 43, respectively.

A part, which is located ahead of the generator main body 21, of the airbag 55 (refer to FIG. 4) in the deployment and non-inflation state is folded, so that the airbag module ABM is formed to have a shape for compact accommodation (not shown) (refer to the dashed-two dotted line in FIG. 11). This is to appropriately accommodate the airbag module ABM in the accommodation part 16 having a limited size in the seat back 14. The airbag module ABM in which the airbag 55 is folded is kept to have a shape for accommodation by a keeping means such as a binding tape (not shown) or the like.

As shown in FIGS. 8 and 9, the airbag module ABM kept to have a shape for accommodation is arranged in the accommodation part 16. Both the mounting protrusions 51 are inserted in insertion holes 17 formed in the side frame part 15 from the vehicle exterior side. Nuts 18 are respectively fastened to both the mounting protrusions 51 from the vehicle interior side, so that the gas generator 20 is mounted to the side frame part 15 together with the airbag 55.

The side airbag device includes a shock sensor 71 and a control device 72 shown in FIG. 1, in addition to the airbag module ABM. The shock sensor 71 includes an acceleration sensor and the like, and is configured to detect a shock that is to be laterally applied to the sidewall part 11 of the vehicle 10. The control device 72 is configured to control an operation of the inflator 22 on the basis of a detection signal from the shock sensor 71.

Also, the vehicle 10 is mounted with a seat belt device for restraining the passenger P1 sitting on the vehicular seat 12. In FIGS. 1 to 3, the seat belt device is not shown.

Subsequently, operations of the side airbag device of the illustrative embodiment configured as described above are described.

First, a sequence of mounting the gas generator 20 and the harness 26 to the airbag 55 is described.

Upon the mounting, as shown in FIG. 10, the outer end part 41 of the retainer 30 is inserted in the insertion opening 62 from the inner side of the bag main body 56. During the insertion, the clearance filling part 66 around the insertion opening 62 of the bag main body 56 is engaged to both the engaging concave portions 43. Then, as shown in FIG. 7, the clearance filling part 66 is positioned at a place, at which the extension part 42 is not formed and which is a boundary part with the extension part 42, of the outer end part 41 of the retainer 30, i.e., at a part close to the extension part 42.

Further, a wall surface of each engaging concave portion 43 is contacted to the clearance filling part 66, thereby restraining the clearance filling part 66 from moving in the radial direction of the retainer 30. By the restraint, the clearance filling part 66 is stably positioned at the part close to the extension part 42.

Also, during the insertion of the outer end part 41 into the insertion opening 62, a lower part of the opening edge portion 65 of the insertion opening 62 of the bag main body 56 is introduced into the notched part 44 of the retainer 30. The gap between the pair of facing wall parts 45, 46 of the notched part 44 increases as being distant radially from the extension part 42. For this reason, it is possible to easily introduce a part (lower part) of the opening edge portion 65 of the insertion opening 62 into the notched part 44.

Each mounting protrusion 51 is inserted in the corresponding insertion hole 63, so that the retainer 30 is engaged to the main body fabric part 58 of the vehicle interior side with being positionally aligned.

In this way, a part of the outer end part 41 of the retainer 30 is arranged outside the bag main body 56, and a remaining part of the retainer 30 including the extension part 42 is arranged inside the bag main body 56.

Then, the inflator 22 is inserted in the retainer 30 from above to below from the outside of the bag main body 56, independently or with the harness 26 being connected to the connected part 25, with a posture that the gas blowout part 27 is located at the lower end portion and the connected part 25 is located at the upper end portion.

Here, if the outer end part 41 is not formed with the engaging concave portions 43, the clearance filling part 66 may be positioned at a place distant from the extension part 42 in the radial direction of the retainer 30. In this case, the clearance filling part 66 interferes with the insertion of the inflator 22. Therefore, it is necessary to take measures to bring the clearance filling part 66 close to the extension part 42 by pushing the clearance filling part, for example. However, in the illustrative embodiment, the clearance filling part 66 is engaged to the engaging concave portions 43, so that the clearance filling part 66 is brought close to the extension part 42. Therefore, the clearance filling part 66 is difficult to interfere with the insertion of the inflator 22, so that it is possible to easily insert the inflator 22 in the retainer 30. Accordingly, it is to not necessary to take the measures of pushing the clearance filling part 66.

As shown in FIG. 9, during the insertion of the inflator 22 into the retainer 30, the clearance filling part 66 is sandwiched by the upper end portion of the gas generation part 23 and the extension part 42.

Also, when a lower surface of the gas generation part 23 collides with the flat plate part 39 of the lower end part of the retainer 30, the inflator 22 is supported from a lower side at the gas generation part 23 by the flat plate part 39, so that the further insertion into the retainer 30 is restrained. Also, as shown in FIG. 11, the inflator 22 is contacted or bought close to the beads 37, so that radial movement thereof is restrained.

The connected part 25 of the inflator 22 is exposed to the outside of the bag main body 56. When the inflator 22 is independently inserted in the retainer 30, the harness 26 is connected to the connected part 25. Therefore, contrary to Patent Document 1 in which the insertion opening is covered by the tongue piece, it is not necessary to perform the operation of inserting the connected part and the harness into the hole of the tongue piece, so that the mounting operability of the gas generator 20 and the harness 26 to the airbag 55 is improved.

Also, the swaged part 47 is positioned outside the bag main body 56 (refer to FIG. 9). As shown with the arrows in FIG. 12, a force is applied to the swaged part 47 from both sides in the circumferential direction. Thereby, as shown with the dashed-two dotted line in FIG. 12, the swaged part 47 is deformed (swaged). A diameter of the outer end part 41 is reduced and is thus press-fitted to the upper part of the gas generation part 23. By the press-fitting, the retainer 30 is engaged to the inflator 22, so that the airbag module ABM is obtained.

The part, which is located ahead of the generator main body 21, of the airbag 55 is folded, so that the airbag module ABM is formed to have a shape for accommodation. The airbag module ABM having a shape for accommodation is mounted to the side frame part 15 at the mounting protrusions 51 provided the retainer 30, as shown in FIG. 8.

Subsequently, operations of the side airbag device of the illustrative embodiment are described.

In FIGS. 1 and 2, when the shock laterally applied to the sidewall part 11 is not detected by the shock sensor 71, an operation signal for operating the inflator 22 is not output from the control device 72 to the inflator 22, so that the inflation gas is not blown out from the gas blowout part 27. The airbag 55 is still accommodated in the accommodation part 16 together with the gas generator 20 while keeping the shape for accommodation.

On the other hand, when a shock of a predetermined value or greater is laterally applied to the sidewall part 11 due to side collision or the like during the traveling of the vehicle 10 and is detected by the shock sensor 71, an operation signal for operating the inflator 22 is output from the control device 72 to the inflator 22 through the harness 26, based on the detection signal. In response to the operation signal, the inflator 22 blows out the inflation gas from the gas blowout part 27.

The inflation gas is supplied to the bag main body 56. At this time, since a part of the clearance between the inflator 22 and the retainer 30 is filled by the clearance filling part 66, the inflation gas blown out from the gas blowout part 27 is more difficult to be leaked to the outside of the airbag 55 through the clearance, as compared to a configuration where the clearance is not filled. Also, the clearance between the opening edge portion 65 of the insertion opening 62 and the retainer 30 is negligible small, so that the inflation gas to be leaked from the clearance to the outside of the airbag 55 is very small.

The bag main body 56 starts to be inflated by the inflation gas supplied as described above. The airbag 55 protrudes forward from the seat back 14 with a part (rear part) remaining in the accommodation part 16.

The airbag 55 to which the inflation gas is still supplied is inflated forward with being solved (deployed) the folded state between the sidewall part 11 and the upper half of the passenger P1 sitting on the vehicular seat 12, as shown with the dashed-two dotted line in FIGS. 1 to 3. At this time, the inflation gas that is leaked from the clearance between the inflator 22 and the retainer 30 and from the clearance between the opening edge portion 65 of the insertion opening 62 and the retainer 30 to the outside of the airbag 55 is very small.

The airbag 55 deployed and inflated in this way is interposed between the upper half of the passenger P1 and the sidewall part 11 being pushed toward the vehicle interior side. By the airbag 55, the upper half is pressed toward the vehicle interior side and is restrained. Then, the lateral shock to be transmitted to the upper half through the sidewall part 11 is relieved by the airbag 55, so that the upper half is protected.

Here, as shown in FIGS. 2 and 3, the clearance between the sidewall part 11 of the vehicle 10 and the passenger P1 sitting on the vehicular seat 12 is narrow. Further, when the shock is laterally applied to the sidewall part 11 due to a collision or the like, the sidewall part 11 is deformed toward the vehicle interior side, so that the clearance between the sidewall part 11 and the passenger P1 is further narrowed. In order to deploy and inflate the airbag 55 in the narrow clearance, it is necessary to deploy and inflate the airbag 55 in a short time. To this end, it is important to reduce a leakage amount of the inflation gas to the outside of the airbag 55.

In this regard, in the illustrative embodiment, as described above, when the structure where the clearance filling part 66 is sandwiched by the inflator 22 and the extension part 42 is adopted, the clearance between the inflator 22 and the retainer 30 is reduced, so that the leakage amount of the inflation gas to the outside of the airbag 55 is reduced. Accordingly, even when the clearance between the sidewall part 11 and the passenger P1 is narrow, it is possible to efficiently deploy and inflate the airbag 55 in a short time, thereby appropriately protecting the passenger P1 from the shock.

In the meantime, as shown in FIG. 7, the upper facing wall part 45 of the notched part 44 to which the bag main body 56 is caught restrains the upward movement of the opening edge portion 65 of the bag main body 56. Therefore, even when a pressure of the inflation gas is applied to the bag main body 56, it is possible to suppress the bag main body 56 from separating from the retainer 30.

Also, the swaged part 47 is swaged, so that the diameter of the outer end part 41 is reduced and is thus press-fitted and engaged to the inflator 22. In addition to this, when the inflator 22 configured to blow out the inflation gas from the gas blowout part 27 is intended to move in the direction of being separated away from the retainer 30, the stopper 48 provided to the retainer 30 directly contacts the tapered part 24 of the inflator 22, thereby restraining the inflator 22 from moving in the corresponding direction. For this reason, it is possible to suppress the inflator 22 from separating from the retainer 30.

In particular, since the stopper 48 is formed at the base part 31 of which stiffness is increased due to the superimposed and joined end portions 32, 33 of the plate material, the stopper is difficult to be deformed even when the inflator 22 is contacted thereto. Therefore, it is possible to support the inflator 22 by the stopper 48 and to further suppress the inflator 22 from separating from the retainer 30.

In the meantime, the illustrative embodiment can be modified, as follow.

<Regarding Accommodation Part 16 of Airbag Module ABM>

Instead of the seat back 14 of the vehicular seat 12, the sidewall part 11 may be provided with the accommodation part 16, in which the airbag module ABM may be incorporated.

<Regarding Gas Generator 20>

At least one of both the mounting protrusions 51 may be changed to a member different from the bolt, on condition that it configures a mounting part for mounting the retainer 30 to the vehicle.

The mounting protrusions 51 may be provided at more places than two places of the retainer 30 in the direction along the axis line L1. In this case, all the mounting protrusions 51 may be mounted to the vehicle (side frame part 15) in the same aspect (for example, fastening by the bolt and the nut) or may be mounted in different aspects.

The gas generator 20 may be configured by the generator main body 21 and one mounting protrusion 51.

The gas generator 20 may be arranged in the bag main body 56 with a posture that the connected part 25 is positioned below the gas blowout part 27.

The generator main body 21 of the gas generator 20 may be arranged with a posture extending in a direction different from the upper and lower direction, for example, in a horizontal direction.

The stopper 48 may be formed at a place different from the base part 31, on condition that it is positioned at a side, which is opposite to the notched part 44 in the direction along the axis line L1 with the swaged part 47 being interposed therebetween, of the outer end part 41 of the retainer 30.

Figure 13:
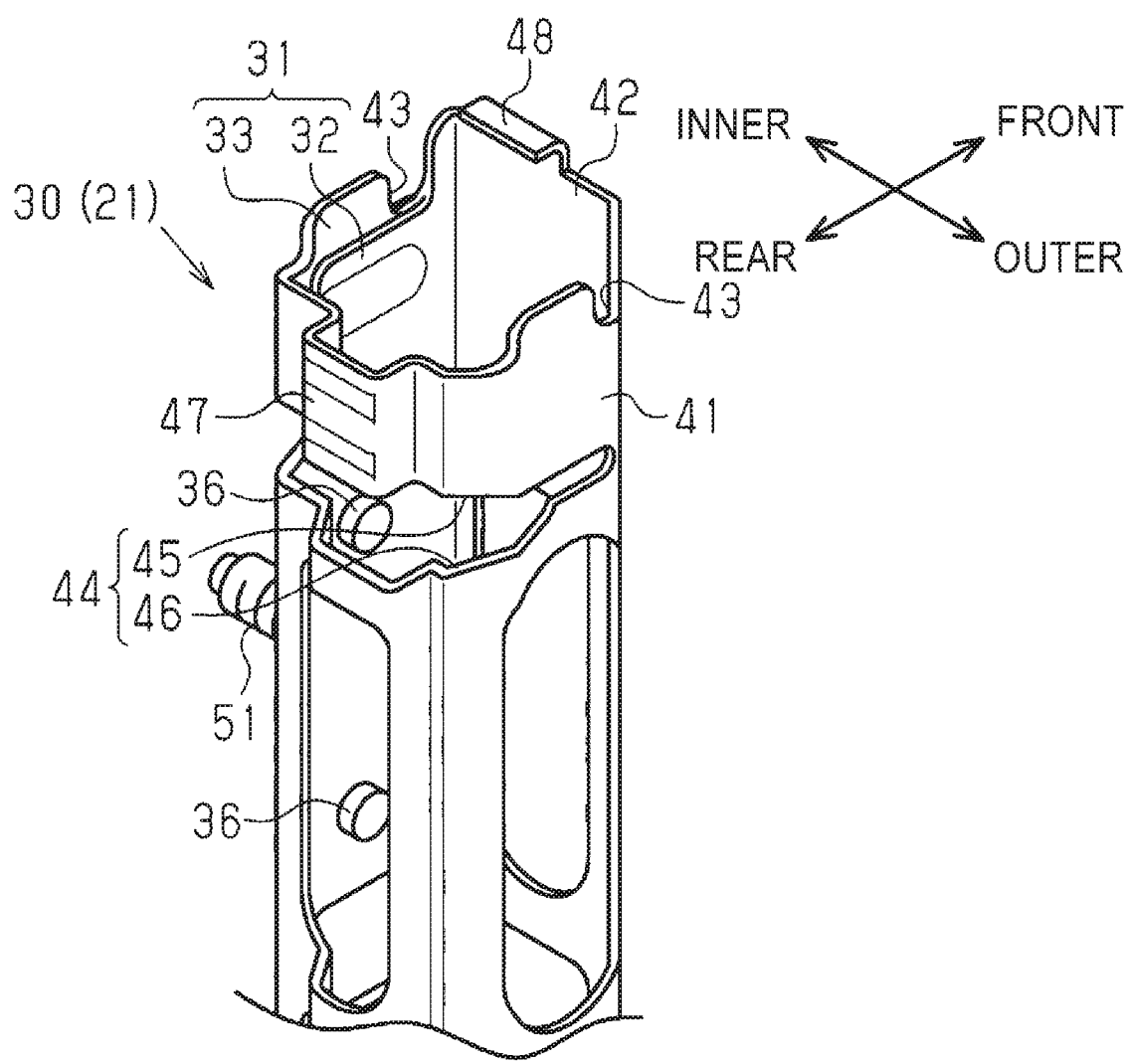
FIG. 13 is a partial perspective view of a retainer of a modified embodiment.

For example, as shown in FIG. 13, the stopper 48 may be formed at a leading end portion (upper end portion) of the extension part 42 in the extending direction of the extension part 42. Meanwhile, in FIG. 13, the same elements as the illustrative embodiment are denoted with the same reference numerals.

By doing so, the stopper 48 is positioned inside the bag main body 56 together with the extension part 42. When the inflator 22 configured to blow out the inflation gas from the gas blowout part 27 is intended to move in the direction of being separated away from the retainer 30, the stopper 48 indirectly contacts the tapered part 24 of the inflator 22 via the bag main body 56, thereby restraining the inflator 22 and the bag main body 56 from moving in the corresponding direction. Accordingly, it is possible to suppress the inflator 22 and the bag main body 56 from separating from the retainer 30.

The number of the engaging concave portions 43 provided to the outer end part 41 of the retainer 30 may be changed to one or three or more. Also, the engaging concave portion 43 may be omitted.

As the inflator 22, an inflator having the gas blowout part 27 at an intermediate part, instead of the end portion in the direction along the axis line L1, may be used.

<Regarding Airbag 55>

The bag main body 56 is preferably configured by the part to be inflated as a whole, like the illustrative embodiment. However, the bag main body may partially include a non-inflation part to which the inflation gas is not to be supplied and which is not to be inflated.

The inside of the bag main body 56 may be configured by one room, instead of being partitioned to the plurality of rooms (inflation rooms).

The part of the upper half of the passenger P1, which is to be protected by the side airbag device, may be changed to a part different from the illustrative embodiment. In this case, the shape and size of the airbag 55 are changed to a shape and a size with which it is possible to protect the target part of the upper half of the passenger P1.

<Regarding Type of Applicable Airbag Device>

The airbag device can be applied to an airbag device different from the side airbag device, inasmuch as the airbag device includes the gas generator and the airbag configured to be deployed and inflated by the inflation gas blown out from the gas blowout part and the gas generator and the airbag are mounted to the vehicle at the mounting part of the retainer.

For example, there is an airbag device for knee protection (also referred to as 'knee airbag device'). This airbag device is configured to inflate the bag main body at a lower side ahead of legs of the passenger sitting on the vehicular seat, in response to a forward shock applied to the vehicle, thereby protecting parts ranging from the shin to the knee of the passenger.

In addition, the airbag device can be applied to a seat cushion airbag device, too. This airbag device is configured to inflate the bag main body arranged in the seat cushion of the vehicular seat and to protrude a sitting surface thereof by the inflation gas, in response to a forward shock applied to the vehicle, thereby restraining the passenger on the seat cushion from moving forward.

<Others>

The side airbag device can be applied to a side airbag device that protects the passenger P1 from a shock when the shock is applied laterally (the front and back direction of the vehicle) to the vehicular seat 12 in a vehicle where the vehicular seat 12 is arranged with a posture that the seat back 14 faces toward a direction different from the front of the vehicle, for example, toward a side.

The vehicle to which the airbag device is to be applied is not limited to an automobile, and includes a variety of industrial vehicles.

The airbag device can be applied to an airbag device that is provided to a vehicle other than the above vehicle, for example, an airplane, a ship and the like, too.

In order to achieve the object, according to an aspect of the invention, there is provided an airbag device comprising: a gas generator which extends along an axis line, and which includes: an inflator having one end portion to which a connected part to which a harness is to be connected is provided; and a cylindrical retainer configured to cover the inflator; and an airbag which includes a bag main body having an insertion opening, wherein a part of an outer end part, which is an end part located at the same side as the connected part of the inflator, of the retainer of the gas generator, which is inserted in the insertion opening, is arranged outside the bag main body together with the connected part of the inflator, and a remaining part of the retainer is arranged inside the bag main body together with a gas blowout part of the inflator, and the airbag configured to be deployed and inflated by an inflation gas to be supplied from the gas blowout part to the bag main body, wherein the gas generator and the airbag are mounted to a vehicle at a mounting part provided to the retainer, the outer end part of the retainer is formed with an extension part extending in a direction of being separated away from the gas blowout part along the axis line, and the bag main body has a clearance filling part that is configured to fill a part of a clearance between the inflator and the retainer and that is provided at a part around the insertion opening, and the clearance filling part is sandwiched by the inflator and the extension part of the retainer.

In the airbag device configured as described above, when mounting the gas generator and the harness, the retainer is inserted in the insertion opening, so that a part of the outer end part of the retainer is arranged outside the bag main body and a remaining part is arranged inside the bag main body. The remaining part includes the extension part.

The inflator is inserted in the retainer from the outside of the bag main body, independently or with the harness being connected to the connected part. By the insertion, the clearance filling part around the insertion opening of the bag main body is sandwiched by the inflator and the extension part.

The connected part is exposed to the outside of the bag main body. When the inflator is independently inserted in the retainer, the harness is connected to the connected part. Therefore, contrary to Patent Document 1 in which the insertion opening is covered by the tongue piece, it is not necessary to perform the operation of inserting the connected part and the harness into the hole of the tongue piece.

In the airbag device, the gas generator and the airbag are mounted to a vehicle at the mounting part provided to the retainer.

When a shock is applied to the vehicle having the airbag device mounted thereto due to a collision or the like, the inflation gas is blown out from the gas blowout part. The inflation gas is supplied to the bag main body, so that the airbag is deployed and inflated to protect the passenger from the shock. Since the clearance between the inflator and the retainer is partially filled by the clearance filling part, the clearance is reduced, as compared to a configuration where the clearance is not filled. For this reason, the inflation gas blown out from the gas blowout part is difficult to be leaked to the outside of the airbag through the clearance.

The extension part may be formed at a portion of the outer end part in a circumferential direction, and a portion, which is located at a side of the extension part in the circumferential direction, of the outer end part may be formed with at least one engaging concave portion that extends in a direction opposite to a direction in which the extension part extends and that is engaged with the clearance filling part.

According to the above configuration, when the clearance filling part of the bag main body is engaged to the engaging concave portion, the clearance filling part is positioned at a place, at which the extension part is not formed and which is a boundary part with the extension part, of the outer end part of the retainer, i.e., at a part close to the extension part.

Further, wall surfaces of the engaging concave portion are contacted with the clearance filling part, thereby restraining the clearance filling part from moving in the radial direction of the retainer. By the restraint, the clearance filling part is stably positioned at the part close to the extension part.

Here, but for the engaging concave portion, the clearance filling part may move farther from the extension part in the radial direction of the retainer. In this case, the clearance filling part interferes with the insertion of the inflator into the retainer, so that it is difficult to insert the inflator into the retainer. Therefore, it is necessary to take measures to bring the clearance filling part close to the extension part by pushing the clearance filling part, for example. However, the clearance filling part is engaged to the engaging concave portion, so that the clearance filling part is brought close to the extension part and the clearance filling part is thus difficult to interfere with the insertion of the inflator. Therefore, it is not necessary to take the measures of pushing the clearance filling part, and it is possible to easily insert the inflator into the retainer.

A notched part may be formed at a place, which is adjacent to a side of the outer end part facing toward the gas blowout part, of the retainer, and extends from a part, which is radially opposite to the extension part with the axis line being interposed therebetween, toward the extension part along a peripheral wall part of the outer end part, the outer end part may include a swaged part for diameter reduction of the outer end part provided at a place, which is adjacent to a side of the notched part separated away from the gas blowout part, and a stopper protruding toward an inner side of the retainer and configured to contact the inflator to thereby restrain the inflator from separating from the retainer may be formed at a part, which is located at an opposite side to the notched part in a direction along the axis line with the swaged part interposed therebetween, of the outer end part.

According to the above configuration, when the swaged part is swaged and a diameter of the outer end part is thus reduced, the outer end part is press-fitted to the inflator and the retainer is engaged to the inflator. In addition to this, when the inflator configured to blow out the inflation gas from the gas blowout part is intended to move in a direction of being separated away from the retainer, the stopper directly or indirectly contacts the inflator, thereby restraining the inflator from moving in the corresponding direction. Accordingly, the inflator is difficult to separate from the retainer.

According to the above configuration, the stopper is positioned inside the bag main body, together with the extension part. When the inflator configured to blow out the inflation gas from the gas blowout part is intended to move in the direction of being separated away from the retainer, the stopper indirectly contacts the inflator via the bag main body, thereby restraining the inflator and the bag main body from moving in the corresponding direction. For this reason, the inflator and the bag main body are difficult to separate from the retainer.

The notched part may have a pair of facing wall parts facing each other in the direction along the axis line, and one of the facing wall parts may be adjacent to the swaged part and the other of the facing parts may be inclined relative to the axis line so that a gap between the facing wall parts increases as being distant from the extension part.

According to the above configuration, the gap between the pair of facing wall parts increases as being more distant from the extension part in the radial direction of the retainer. For this reason, when inserting the outer end part in the insertion opening, it is possible to enable the notched part of the retainer to be caught at a part of the opening edge portion of the insertion opening of the bag main body.

When the retainer is caught to the bag main body at the notched part, one facing wall part of the notched part restrains the opening edge portion of the bag main body from moving toward the connected part. For this reason, even when a pressure of the inflation gas is applied to the bag main body, the bag main body is difficult to separate from the retainer.

When a shock is laterally applied to a sidewall part of the vehicle, the airbag may be deployed and inflated between the sidewall part and a vehicular seat, thereby protecting a passenger sitting on the vehicular seat from the shock.

A clearance between the sidewall part of the vehicle and the passenger sitting on the vehicular seat is narrow. Further, when the shock is laterally applied to the sidewall part due to the collision or the like, the sidewall part is deformed toward the room interior. Therefore, the clearance between the sidewall part and the passenger is further narrowed. In order to deploy and inflate the airbag in the narrow clearance, it is necessary to deploy and inflate the airbag in a short time. To this end, it is important to reduce a leakage amount of the inflation gas to the outside of the airbag. In this regard, as described above, when the structure where the clearance filling part of the bag main body is sandwiched by the inflator and the extension part of the retainer is adopted, the clearance between the inflator and the retainer is reduced, so that the leakage amount of the inflation gas to the outside of the airbag is reduced. Accordingly, even when the clearance between the sidewall part and the passenger is narrow, it is possible to efficiently deploy and inflate the airbag in a short time, thereby appropriately protecting the passenger from the shock.

According to the airbag device, it is possible to improve the mounting operability while suppressing the leakage of the inflation gas to the outside of the airbag.

What is claimed is:

1. An airbag device comprising:
a gas generator which extends along an axis line, and which includes: an inflator having one end portion to which a connected part to which a harness is to be connected is provided; and a cylindrical retainer configured to cover the inflator; and
an airbag which includes a bag main body having an insertion opening, wherein a part of an outer end part, which is an end part located at the same side as the connected part of the inflator, of the retainer of the gas generator, which is inserted in the insertion opening, is arranged outside the bag main body together with the connected part of the inflator, and a remaining part of the retainer is arranged inside the bag main body together with a gas blowout part of the inflator, and the airbag configured to be deployed and inflated by an inflation gas to be supplied from the gas blowout part to the bag main body, wherein:
the gas generator and the airbag are mounted to a vehicle at a mounting part provided to the retainer,
the outer end part of the retainer is formed with an extension part extending in a direction of being separated away from the gas blowout part along the axis line,
the bag main body has a clearance filling part that is configured to fill a part of a clearance between the inflator and the retainer and that is provided at a part around the insertion opening, the clearance filling part being sandwiched by the inflator and the extension part of the retainer,
the extension part is formed at a portion of the outer end part in a circumferential direction, and
a portion, which is located at a side of the extension part in the circumferential direction, of the outer end part is formed with at least one engaging concave portion that extends in a direction opposite to a direction in which the extension part extends and that is engaged with the clearance filling part.

2. The airbag device according to claim 1, wherein:
a notched part is formed at a place, which is adjacent to a side of the outer end part facing toward the gas blowout part, of the retainer, and extends from a part, which is radially opposite to the extension part with the axis line being interposed therebetween, toward the extension part along a peripheral wall part of the outer end part,
the outer end part includes a swaged part for diameter reduction of the outer end part provided at a place, which is adjacent to a side of the notched part separated away from the gas blowout part, and
a stopper protruding toward an inner side of the retainer and configured to contact the inflator to thereby restrain the inflator from separating from the retainer is formed at a part, which is located at an opposite side to the notched part in a direction along the axis line with the swaged part interposed therebetween, of the outer end part.

3. The airbag device according to claim 2, wherein the stopper is formed at a leading end portion of the extension part in the extending direction.

4. The airbag device according to claim 2, wherein:
the notched part has a pair of facing wall parts facing each other in the direction along the axis line, and
one of the facing wall parts is adjacent to the swaged part and the other of the facing parts is inclined relative to the axis line so that a gap between the facing wall parts increases as being distant from the extension part.

5. The airbag device according to claim 1, wherein when a shock is laterally applied to a sidewall part of the vehicle, the airbag is deployed and inflated between the sidewall part and a vehicular seat, thereby protecting a passenger sitting on the vehicular seat from the shock.

6. The airbag device according to claim 1, wherein the remaining part of the retainer arranged inside the bag main body includes the extension part.

* * * * *